United States Patent

[11] 3,604,676

| [72] | Inventor | Walter H. Weber |
| | | Metuchen, N.J. |
| [21] | Appl. No. | 868,108 |
| [22] | Filed | Oct. 21, 1969 |
| [45] | Patented | Sept. 14, 1971 |
| [73] | Assignee | Thomas & Betts Corporation |
| | | Elizabeth, N.J. |

[54] GROUNDING AND CLAMPING DEVICE
4 Claims, 17 Drawing Figs.

[52] U.S. Cl. .................................................... 248/68,
248/72, 248/226 A
[51] Int. Cl. ............................................... F16l 3/10
[50] Field of Search ............................................ 248/72, 68,
68 CB, 70, 230, 226 A

[56] References Cited
UNITED STATES PATENTS

| 1,777,884 | 10/1930 | Horix ............................ | 248/230 |
| 1,877,781 | 9/1932 | Akerlund ...................... | 248/72 |
| 2,425,935 | 8/1947 | Hayman ....................... | 248/68 X |
| 3,138,360 | 6/1964 | Matthiessen ................. | 248/72 |
| 3,146,982 | 9/1964 | Budnick ....................... | 248/68 |
| 3,228,639 | 1/1966 | Korns .......................... | 248/72 |
| 3,397,431 | 8/1968 | Walker ......................... | 248/68 X |

Primary Examiner—Chancellor E. Harris
Attorney—David Teschner

ABSTRACT: A grounding and clamping device comprised of a combination conduit receiving and locking member and flange clamp to rigidly secure and ground a metallic electrical conduit to a supporting metallic structure. A pair of adjustably coupled recessed members provide a conduit receiving cavity therebetween within which the conduit may be secured; the recessed members may be tightened about the conduit placed within the cavity by threadably engaging threaded extensions protruding from one recessed member and through registering apertures in the other. Coupled to and extending from one of the recessed members is a flange clamp adapted to rigidly secure the recessed members to a support member. At each end of the flange-adapted recessed member is a locking means threadably coupled thereto and extending into the clamp aperture to provide biting engagement between the recessed members and the support member.

PATENTED SEP 14 1971 3,604,676

INVENTOR.
WALTER H. WEBER
BY David Tischer
ATTORNEY

INVENTOR.
WALTER H. WEBER
BY David Teachine
ATTORNEY

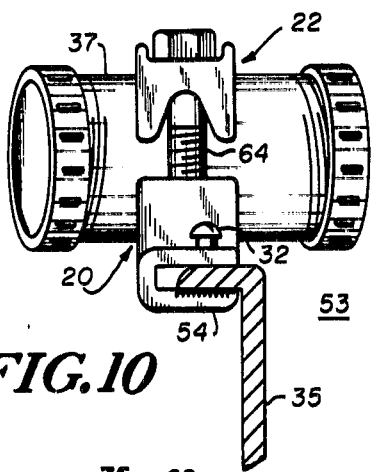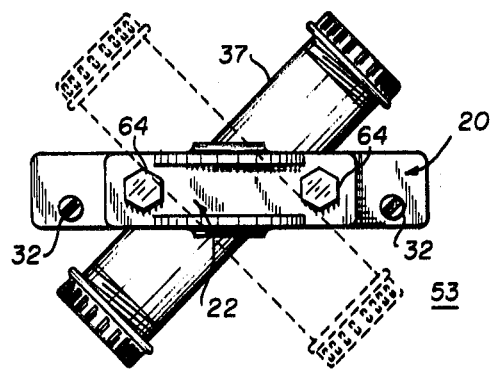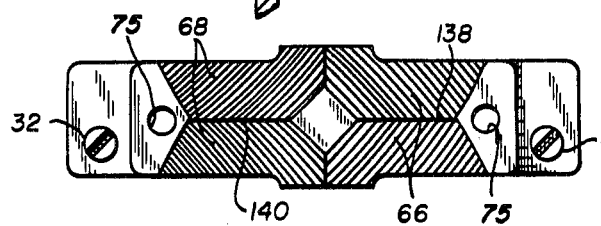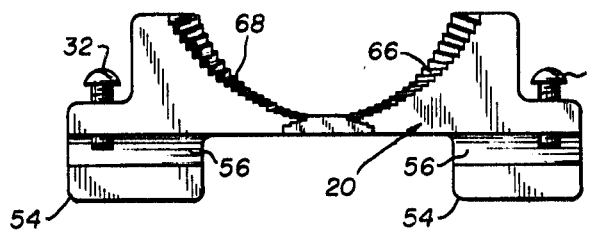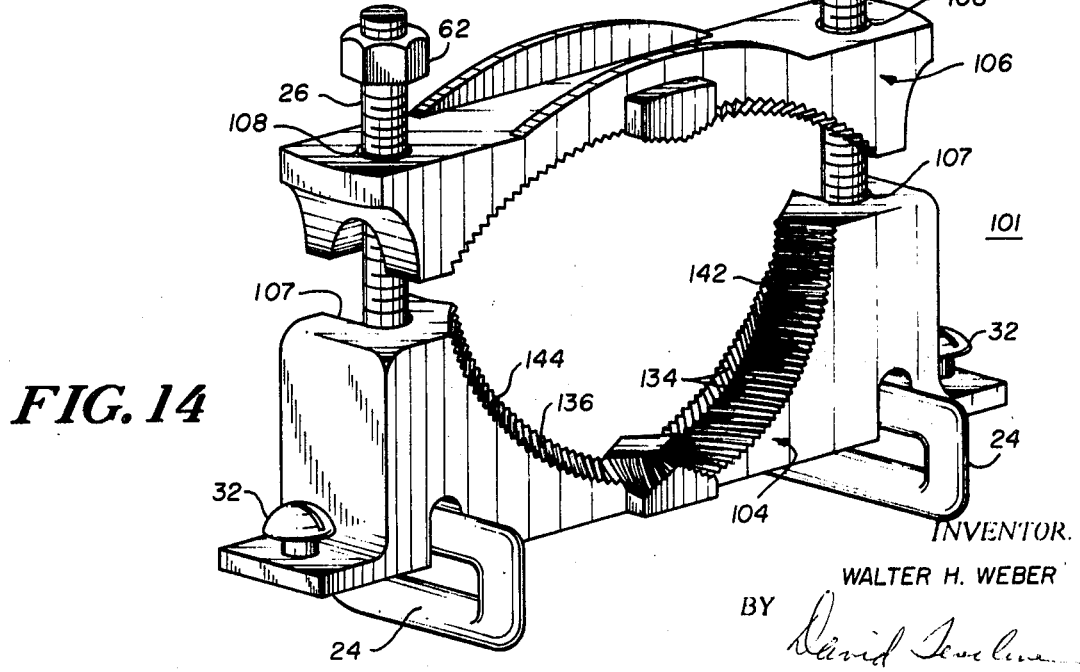

INVENTOR.
WALTER H. WEBER

BY *David [signature]*

ATTORNEY

GROUNDING AND CLAMPING DEVICE

BACKGROUND OF THE INVENTION

1. Field of the Invention

The invention is directed to the field of clamping and grounding means and more particularly to a clamping and grounding device for metallic conduit. The clamping and grounding device of this invention is particularly adapted to rigidly secure a metallic conduit to a metallic support structure.

2. Description of the Prior Art

Prior art devices for grounding and clamping metallic conduits to metallic support members utilized conventional threaded U-bolts, expensive threaded metallic bushings, bonding jumpers, pressure plates, and ground fittings to establish a reliable ground between the metallic electrical conduit and the adjacent metallic support structure. An apertured preformed metallic pressure plate engages the threaded leg extensions of a U-bolt disposed about the metallic conduit. A recess in a first end of the pressure plate cradles a portion of the conduit therein, the second end of the pressure plate engaging the under surface of a flange of the support structure upon which the conduit is seated. The pressure plate is then urged against the conduit and the supporting flange by means of threaded nuts drawn up on the projecting threaded leg extensions of the U-bolt, thereby attempting to rigidly secure the conduit to the supporting flange. Because of the unreliability of the pressure contact between the pressure plate and the supporting flange in providing a sufficient ground connection, a relatively expensive threaded metallic bushing and grounding jumper is utilized to ensure adequate grounding of the conduit. One end of the grounding jumper is fastened to the metallic bushing threadably engaged to one end of the conduit. The other end is then secured to an appropriate ground fitting bolted to the support member and adapted to receive such end, thus requiring the assembly of a great number of separate and discreet parts in a time consuming and expensive assembly operation. The pressure flange, U-bolt leg extensions and threaded nuts engaged thereon, and the ground fitting bolt all extend generally into the cable tray or support, resulting in a substantial likelihood of damage to the insulation of the cables supported thereon, or pulled therethrough with the resultant potential of short circuits and fire and shock hazard. Moreover, the inaccessability of the fastening components within the cable tray render assembly inconvenient, difficult, and unreliable. Additionally, such prior art devices lacked provision for adequate conduit orientation during assembly, thereby requiring excessive bending of the cable for proper accommodation within the conduit, giving rise to further possible damage to the cable insulation and wire contained therein.

SUMMARY OF THE INVENTION

The present invention overcomes the difficulties noted above with respect to known prior art devices by providing an improved grounding and clamping device which is structurally safer, less expensive, and more reliable and convenient than such devices. Firstly, the conduit engaging and locking portion of the device has first and second recessed body portions, each recess axially oriented substantially perpendicular to the longitudinal axis thereof. The body portions may have one or more recesses therein to provide for a varying number of conduit receiving cavities. The recesses may be at least partially serrated, the discreet projecting surfaces resulting therefrom providing a means for establishing biting engagement between the body portions and the metallic conduit disposed therebetween. Such recesses may be either substantially arcuate or V-shaped. Each body portion may be substantially channel shaped, wherein the conduit-receiving cavity is defined by recesses longitudinally disposed along the free edges of the upturned sides. Threaded coupling means may extend from one body portion and through registering apertures in another body portion, and such body portions may then be rigidly secured about a conduit disposed therebetween by suitable fastening means. A clamping portion is coupled to and extends from a first body portion to define a slot between it and the first body portion for engaging a support member in clamping relationship. Additionally, the recessed surfaces of each of the first and second body portions may be defined by at least two pair of surfaces disposed longitudinally along the first and second body portions, each surface of a pair in oblique planar relationship, one to the other, and communicating at a first edge of each to form a crest, the second edge of each communicating with opposite sides of the respective first and second body portions. The conduit-receiving cavity thereby defined permits a conduit engaged therein to be rigidly secured in offset angular relationship with the axis of the conduit receiving cavity. Further, the surfaces may be partially or fully serrated to provide additional biting engagement between the engaged conduit and an adjacent surface of the body portion. Additionally, the plane of the surfaces may be curvilinear.

Adjustable locking means may be threadably coupled to the first body portion and extend therethrough to lock a first body portion to a support member. It is therefore an object of this invention to provide an improved conduit grounding and clamping device.

It is another object of this invention to provide an improved grounding and clamping device having first and second body portions coupled to form a conduit-receiving cavity therebetween.

It is yet another object of this invention to provide an improved grounding and clamping device having clamping means coupled to one of the body portions to permit the device to be clamped to a support member.

It is still another object of this invention to provide an improved grounding and clamping device wherein the body portions thereof each have generally recessed surfaces defining a cavity wherein a conduit seated therein may be rigidly secured between cooperating body portions.

It is a further object of this invention to provide an improved grounding and clamping device having adjustable locking means to contact in locking engagement an adjacent surface of a support member interposed between a body portion and clamping means coupled thereto.

It is yet a further object of this invention to provide an improved grounding and clamping device having a generally recessed surface in each of a first body portion and a second body portion defined by at least two pair of surfaces, each surface of a pair of surfaces being in oblique planar relationship one to the other, longitudinally disposed along the first and second body portions, and communicating with the other surface of the pair at a first edge, forming a crest, the second edge of each surface communicating with opposite sides of the first and second body portions, whereby a conduit engaged between the first and second body portions may be rigidly secured therebetween in offset angular relationship with the axis of the conduit-receiving cavity.

It is still another object of this invention to provide an improved grounding and clamping device having a generally L-shaped clamping means coupled to a first body portion, and formed from the looped end portion of a threaded U-bolt, the threaded leg extensions of which extend through an aperture in the first body portion and through a registering aperture in a second body portion to provide threaded coupling means therebetween.

It is yet a further object of this invention to provide an improved grounding and clamping device wherein clamping means coupled to a first body portion and recessed surfaces on the first body portion and a second body portion are at least partially serrated, the discreet projecting surfaces resulting therefrom providing a means for establishing biting engagement between those portions and members interposed therebetween.

Other objects and features of the invention will be pointed out in the following description and claims and illustrated in the accompanying drawings, which disclose, by way of example, the principles of the invention, and the best modes which have been contemplated for carrying them out.

BRIEF DESCRIPTION OF THE DRAWINGS

In the drawings in which similar elements are given similar reference characters:

FIG. 10 is a side elevation view of the grounding and clamping device of FIG. 9 as secured to a support member and engaging a conduit therein.

FIG. 11 is a top plan view of the assembly of FIG. 10.

FIG. 12 is a top plan view of the first body portion of the grounding and clamping device of FIG. 9.

FIG. 13 is a front elevation view thereof.

FIG. 14 is a perspective view of yet another embodiment of a grounding and clamping device constructed in accordance with the concepts of the invention.

DESCRIPTION OF THE PREFERRED EMBODIMENTS

Figure 1:
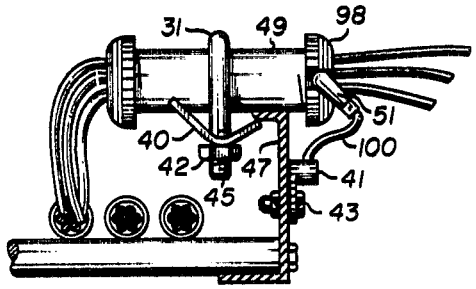
FIG. 1 is a front elevation view of a prior art device mounted to a support with a conduit placed therein.

Turning now to FIG. 1, there is shown a representative prior art conduit grounding and clamping device. The inverted U-bolt 31 is supported directly by conduit 49, while the threaded leg extensions 45 thereof depend below the conduit 49, extending through registering apertures in a pressure plate 40 and into the cable tray area. One end of pressure plate 40 is contoured to partially cradle a lower portion of conduit 49, the other end upwardly formed to engage the underside of a support flange 47 on which conduit 49 is seated. Nuts 42, threaded on the leg extensions 45 of U-bolt 31, when tightened serve to urge the pressure plate 40 into engagement with the support flange 47, in an attempt to secure the conduit 49 thereto. Threadably coupled to the end of the conduit 49 overhanging the support flange 47 is a metallic bushing 98, adapted to receive thereon a first terminated end 51 of a bonding jumper 100. Bolt 43 serves to threadably couple a ground fitting 41, adapted to receive the second terminated end of bonding jumper 100, to the support flange 47.

Figure 3:
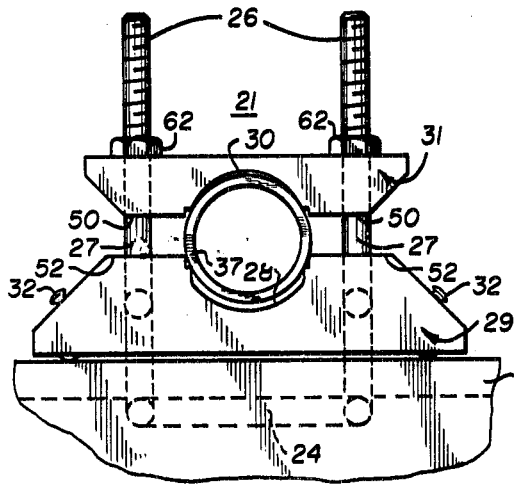
FIG. 3 is a front elevation view of the assembly of FIG. 2.
Figure 2:
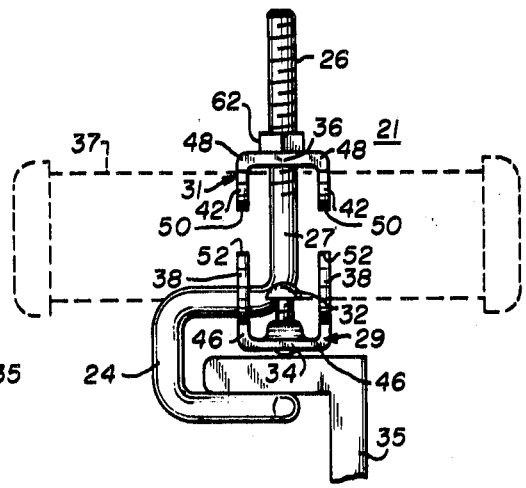
FIG. 2 is a side elevation view of a grounding and clamping device constructed in accordance with the concepts of the invention, illustrating the manner in which the device may be used to secure and ground a conduit to a support member.
Figure 7:
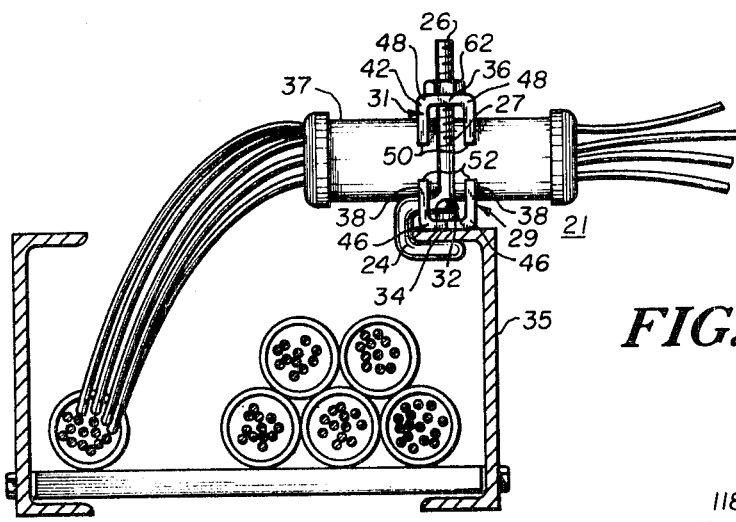
FIG. 7 is a side elevation view of the assembly of FIG. 2, further illustrating a cable tray attached to the support member.

Referring now to FIGS. 2, 3 and 7, there is shown a first embodiment of a grounding and clamping device 21 constructed in accordance with the concepts of the invention. A first body portion 29 has a pair of generally upturned sides 38 spaced apart therebetween at a first edge 46 of each by a web portion 34. A partially serrated, generally recessed surface 28 is disposed along a second edge 52 of each of the upturned sides 38 of the first body portion 29. Apertures (not visible in the figures) extending between one of the upturned sides 38 and the web portion 34 of the first body portion 29 are adapted to receive threaded coupling means or U-bolt 27 therethrough. The partially serrated, generally recessed surface 28 is axially disposed substantially transverse to the longitudinal axis of the first body portion 29. A second body portion 31 is similarly constructed, having a pair of upturned sides 42 coupled at a first edge 48 of each to an apertured web portion 36, and further comprising a partially serrated, generally recessed surface 30 along a second edge 50 of each of the upturned sides 42. The recessed surfaces 28 of the first body portion 29 and the recessed surface 30 of the second body portion 31 define a conduit-receiving cavity therebetween, wherein a conduit may be rigidly secured. The first body portion 29 is coupled to the second body portion 31 by means of the threaded leg extensions 26 of U-bolt 27 extending through the apertures in the first body portion 29 and the registering apertures (not visible in the figures) in the web portion 36 of the second body portion 31. The looped end portion 24 of U-bolt 27 has a generally C-shaped profile axially disposed in substantially parallel planar relationship with and offset from the plane of the threaded leg extensions 26 forming a generally L-shaped clamping means thereby. Threaded locking means such as screws 32 threadably engaged within threaded apertures in the web portion 34 of the first body portion 29 are provided to contact in locking engagement an adjacent surface of a support member 35 interposed between the first body portion 29 and the looped end portion 24 of U-bolt 27. Threaded fastening means such as nuts 62 are provided to forcibly displace the second body portion 31 towards the first body portion 29 and to rigidly secure therebetween a conduit 37 positioned within the conduit receiving cavity defined by surfaces 28 and 30. In practice, the second body portion 31 is initially spaced apart from the first body portion 29 a sufficient distance to permit a conduit such as conduit 37 to be positioned therebetween and within the conduit-receiving cavity defined by surfaces 28 and 30. Nuts 62 are then threadably engaged upon the threaded leg extensions 26 protruding from the apertures in the web portion 36 of the second body portion 31 and drawn tight to forcibly displace the second body portion 31 towards the first body portion 29, thereby rigidly securing the conduit 37 therebetween. A support member 35 interposed between the looped end portion 24 of U-bolt 27 and the web portion 34 of the first body portion 29 may be clamped securely therebetween by tightening the locking means 32 upon the surface of the support member 35 adjacent the web portion 34. The serrations of the recessed surfaces 28 and 30 of the first and second body portions 29 and 31, respectively, engage and bite into the outer surface of the metallic conduit 37 serving to ensure a good contact therebetween. Thusly, the metallic conduit 37 between the first and second body portions 29 and 31, respectively, is in intimate contact therewith, the locking means 32 providing further biting contact between the first body portion 29 and the metallic support flange 35. The biting action of the serrations on surfaces 28 and 30 and the locking means 32 break up surface oxides and remove dirt permitting contact with fresh metal of the conduit 37 and the support member 35 thereby establishing a proper ground therebetween.

Figure 4:
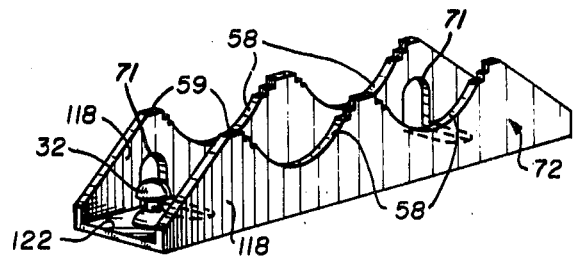
FIG. 4 is a perspective view of a first body portion of a grounding and clamping device constructed in accordance with a second embodiment of the invention.
Figure 8:
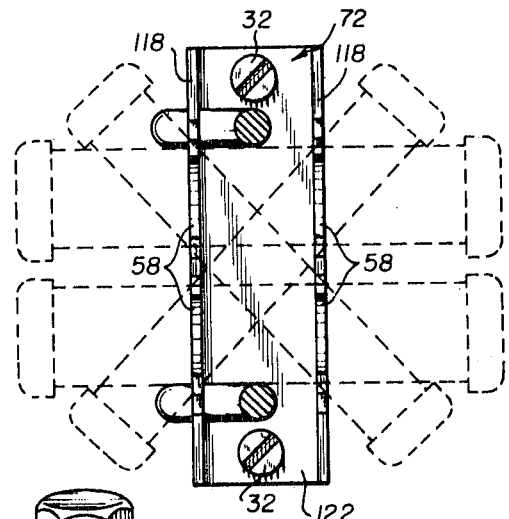
FIG. 8 is a top plan view of the first body portion of FIG. 4 illustrating the manner in which a conduit may be seated therein.
Figure 9:
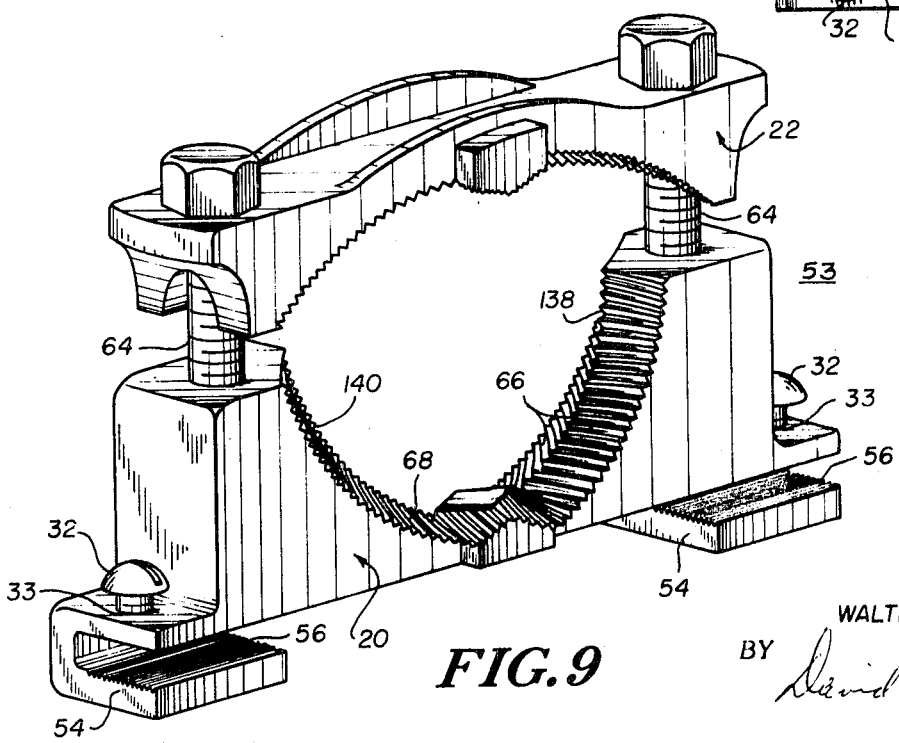
FIG. 9 is a perspective view of a further embodiment of a grounding and clamping device constructed in accordance with the concepts of the invention.

Turning now to FIGS. 4 and 8, a further embodiment of a grounding and clamping device first body portion is shown. In FIG. 4 first body portion 72 comprises two generally recessed, partially serrated surfaces 58 along a first edge 59 of each of a pair of upturned sides 118. A second body portion (not shown) is similarly contoured and is coupled to the first body portion 72 in the manner set forth with respect to FIG. 2, resulting in a pair of conduit-receiving cavities defined thereby. A pair of spaced apertures 71 extending through one of the sidewalls 118 are arranged to receive the looped-end portion 24 of U-bolt 27 in a manner similar to that shown in FIG. 2. As may be better seen in FIG. 8, the combination of conduit-receiving cavities permit a choice of securing and clamping either a pair of metallic conduits therebetween or a single metallic conduit axially disposed in offset angular relationship with the longitudinal axis of the body portion 72. It should be understood that a plurality of generally recessed surfaces such as 28 and 30 along upturned sides such as 38 and 42, respectively, may be incorporated within first and second body portions such as 29 and 31, respectively, of FIG. 2 to provide a plurality of conduit-receiving cavities therebetween, without departing from the spirit of the invention.

Figure 5:
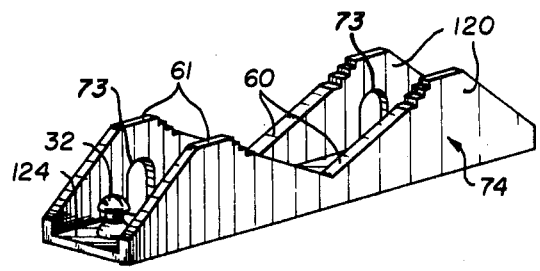
FIG. 5 is a perspective view of a first body portion of a grounding and clamping device constructed in accordance with a further embodiment of the invention.

Turning now to FIG. 5, a further embodiment of a grounding and clamping device first body portion is shown. The first body portion 74 has upturned sides 120 coupled to a web portion 124. A pair of spaced apertures 73 are essentially duplicative of apertures 71 in FIG. 4 and extend through one of the upturned sides 120. The generally recessed surfaces 60 along edges 61 of the upturned sides 120 are defined by substantially V-shaped cutouts. As in the embodiment depicted in FIG. 4, it should be understood that a plurality of V-shaped cutouts defining generally recessed surfaces such as 60 may be incorporated along edges such as 52 and 50 of body portions such as 29 and 31 respectively of FIG. 2 to provide a plurality of conduit-receiving cavities therebetween without departing from the spirit of the invention.

Figure 6:
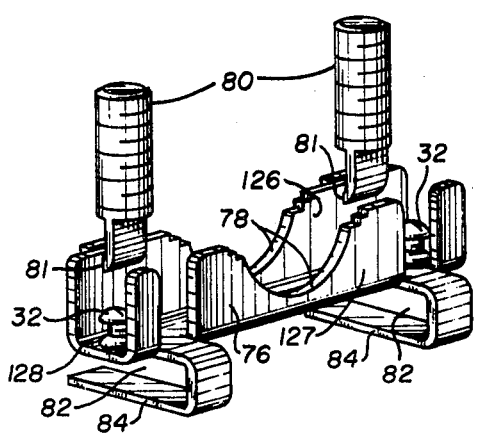
FIG. 6 is a perspective view of a first body portion of a grounding and clamping device constructed in accordance with another embodiment of the invention, and including threaded coupling means attached thereto.

Referring now to FIG. 6, a further embodiment of a grounding and clamping device first body portion, including coupling means and clamping means, is shown. First body portion 76 has partially serrated, generally recessed surfaces 78 disposed along the edges of a pair of upturned sides 126 and 127. The looped-end portion of each of a pair of threaded coupling means such as the threaded rods 80 engage one of a pair of apertures 81 extending through upturned side 126 of first body portion 76 and spaced apart longitudinally thereof. The threaded end of each of the threaded rods 80 is adapted to extend through a registering aperture in the web portion of a second body portion (not shown) to permit the first and second body portions to be coupled together. A pair of generally L-shaped clamping means 84 adapted to engage a support member in clamped relationship underlie web portion 128, depending therefrom in spaced-apart longitudinal relationship, being formed from a predetermined length of a portion of upturned side 127. Threaded apertures spaced apart longitudinally of the web portion 128 and extending therethrough are adapted to receive threaded locking means such as screws 32, permitting a support member interposed within the generally L-shaped clamping means 84 to be locked therebetween by tightening the screws 32 upon an adjacent surface thereof.

Referring now to FIGS. 9, 10, 11, 12 and 13, a further embodiment of a grounding and clamping device 53 is shown. First body portion 20 has a generally recessed surface defined by two pair of substantially serrated curvilinear surfaces 66 and 68, the surfaces of each pair disposed in oblique planar relationship one to the other, and extending longitudinally of the first body portion 20. Each of a pair of surfaces such as 66 and 68 communicate at a first edge to form a crest 138 and 140, respectively, the second edge of each communicating with opposite sides of the first body portion 20, as may be better seen in FIGS. 12 and 13. Similarly, two pair of obliquely disposed, substantially serrated, curvilinear surfaces longitudinally disposed within a second body portion 22 define a like generally recessed surface therein, which, in combination with the generally recessed surface of the first body portion 20, serves to define a conduit-receiving cavity therebetween. Threaded coupling means such as studs 64 extend through appropriate apertures intermediate the ends of the second body portion 22, and threadably engage suitable registering threaded apertures 75 in the first body portion 20, whereby a conduit positioned within the generally recessed surfaces of the first and second body portions 20 and 22, respectively, may be rigidly secured therebetween by turning studs 64 to forcibly urge the second body portion 22 towards the first body portion 20. As may be better seen in FIG. 11, the relative positions of the two pair of obliquely disposed surfaces 66 and 68 of the first body portion 20 in combination with similarly disposed surfaces of the second body portion 22 permit a conduit seated therebetween to be positioned in offset angular relationship longitudinally therewith providing greater flexibility and convenience thereby. Threaded apertures 33 (see FIG. 9) intermediate of the ends of the first body portion 20, and extending therethrough, are adapted to threadably receive therein locking means such as screws 32. Preferably serrated generally L-shaped clamping means 54 are coupled to and extend from the first body portion 20, providing a support member receiving slot 56 therebetween adjacent to and communicating with threaded aperture 33 permitting the support member engaged therein to be held in locking relationship with respect to the first body portion 20 by tightening screw 32 upon an adjacent surface of the support member as shown in FIG. 10.

Turning now to FIG. 14, a further embodiment of a grounding and clamping device 101 is shown. A modified looped end portion of a U-bolt provides substantially L-shaped clamping means 24 coupled to and extending beyond a first body portion 104. The threaded leg extensions 26 of the modified U-bolt extend outwardly from appropriate apertures 107 disposed substantially transverse to the longitudinal axis of the first body portion 104 and through registering apertures 108 in a second body portion 106. Fastening means such as nuts 62 threadably engage the protruding ends of the threaded leg extensions 26. The generally recessed surfaces of the first body portion 104 and second body portion 106 define a conduit-receiving cavity substantially as described with respect to the grounding and clamping device of FIG. 9. Threaded locking means such as screws 32 are disposed adjacent the ends of the first body portion 104, and are threadably engaged within appropriate apertures extending therethrough.

Figure 15:
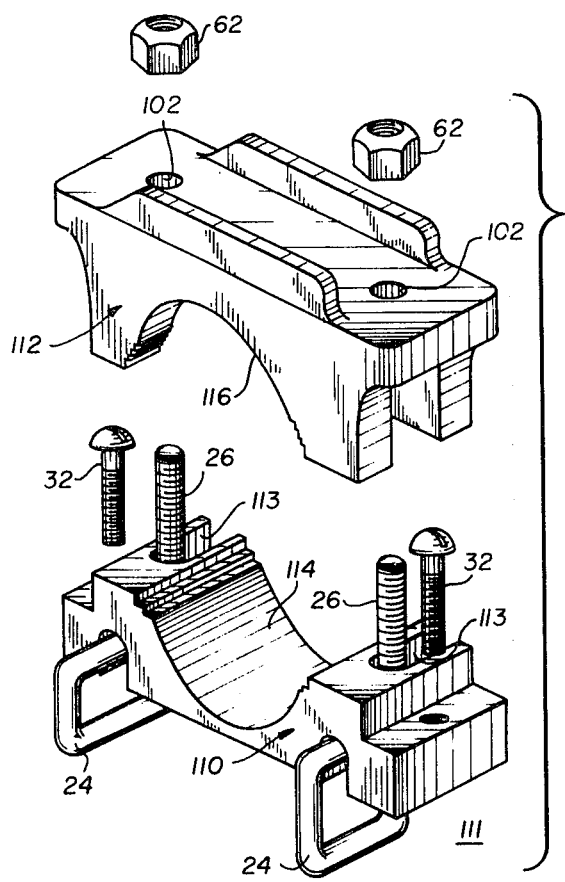
FIG. 15 is an exploded perspective view of still another embodiment of a grounding and clamping device constructed in accordance with the concepts of the invention.

Referring now to FIG. 15, a further embodiment of a 1 and clamping device 111 is shown. A first body portion 110 has a partially serrated, generally recessed surface 114 therein defining a portion of a conduit-receiving cavity, the other portion of which is defined by a similar partially serrated, generally recessed surface 116 of a second body portion 112. The L-shaped clamping means 24, threaded leg extensions 26, fastening means 62, and locking means 32 duplicate similar portions of FIG. 14.

Figure 16:
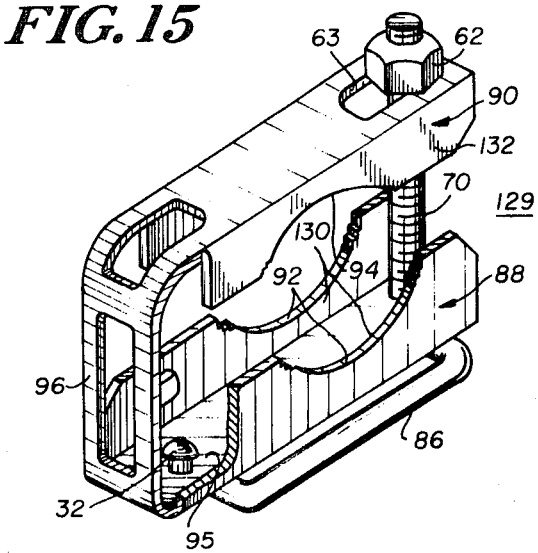
FIG. 16 is a perspective view of a still further embodiment of a grouping and clamping device constructed in accordance with the concepts of the invention.
Figure 17:
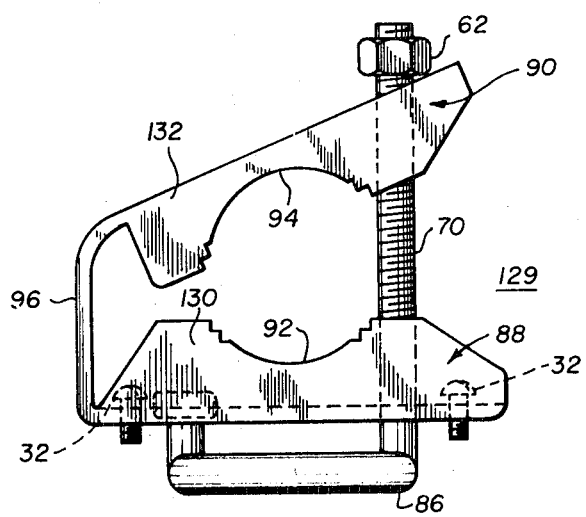
FIG. 17 is a front elevation view of the grounding and clamping device of FIG. 16.

Turning now to FIGS. 16 and 17, a further embodiment of a grounding and clamping device 129 is shown. First and second body portions 88 and 90, respectively, are coupled at one end of each by a reduced cross section portion 96 integral therewith, and providing a hinge-type coupling therebetween. One end of threaded member 70 extends from the first body portion 88 and through a registering aperture 63 (see FIG. 16) in the second body portion 90, permitting a threaded fastening means such as nut 62 to be threadably engaged thereon for forcibly displacing the second body portion 90 towards the first body portion 88 to secure a conduit (not shown) in rigid engagement therebetween. The other end of threaded member 70 extends through a first aperture (not visible in the figures) in web portion 95 of the first body portion 88, and longitudinally thereof, terminating at a second aperture spaced apart longitudinally of the first body portion 88 and substantially adjacent the reduced cross section portion 96, providing a generally L-shaped clamping means 86 thereby, similar to portion 24 of FIG. 3. Generally recessed surfaces 92 and 94 of upstanding sides 130 and 132 of first and second body portions 88 and 90, respectively, duplicate portions 28, 30, 38 and 42 of body portions 29 and 31 of FIGS. 2 and 3.

The embodiments of the invention in which an exclusive property or privilege is claimed are defined as follows:

1. A grounding and clamping device comprising: a first body portion; a second body portion; means for coupling said first body portion to said second body portion to form a conduit-receiving cavity therebetween; clamping means coupled to said first body portion to clamp said first body portion to a support member; and adjustable locking means threadably coupled to said first body portion and extending therethrough to contact in locking engagement an adjacent surface of a support member interposed between said first body portion and said clamping means; said first body portion having at least one generally recessed surface disposed substantially transverse to the longitudinal axis of said first body portion; said second body portion having a similar generally recessed surface disposed substantially transverse to the longitudinal axis of said second body portion; each of said generally recessed surfaces being defined by at least two pair of surfaces, each surface of one said pair of surfaces in oblique planar relationship one to the other, each said pair of surfaces disposed longitudinally along said first and second body portions, each said pair of surfaces communicating at a first edge of each of said surfaces forming a crest, the second edge of each of said surfaces communicating with opposite sides of said first and second body portions, whereby a conduit engaged between said first and second body portions may be rigidly secured therebetween, the longitudinal axis of said conduit in offset angular relationship with the axis of said conduit-receiving cavity.

2. A grounding and clamping device as defined in claim wherein each said surface of said pair of surfaces is at least partially serrated.

3. A grounding and clamping device as defined in claim 1 wherein the plane of said surfaces is substantially curvilinear.

4. A grounding and clamping device comprising: a first body portion; a second body portion; means for coupling said first body portion to said second body portion to form a conduit-receiving cavity therebetween; and clamping means coupled to said first body portion to clamp said first body portion to a support member; said first body portion having at least one generally recessed surface disposed substantially transverse to the longitudinal axis of said first body portion; said second body portion having a similar generally recessed surface disposed substantially transverse to the longitudinal axis of said second body portion, said recessed surfaces defining a cavity wherein a conduit seated within said cavity may be rigidly secured therebetween; said clamping means being a generally L-shaped portion coupled to said first body portion, the open portion of said L-shaped portion and an adjacent surface of said first body portion defining a slot therebetween for engaging a support member; said L-shaped portion being the looped end portion of a threaded U-bolt, said looped end portion having a substantially C-shaped profile axially disposed in substantially parallel planar relationship with and offset from the plane of the threaded leg extensions of said U-bolt, at least one of said threaded leg extensions extending through an aperture in one of said upturned portions of said first body portion and through a registering aperture in said web portion of said second body portion.